No. 783,712. PATENTED FEB. 28, 1905.
F. K. VREELAND.
APPARATUS FOR RECEIVING ELECTROMAGNETIC WAVES OR OTHER FEEBLE
ALTERNATING SIGNAL IMPULSES.
APPLICATION FILED NOV. 12, 1904.
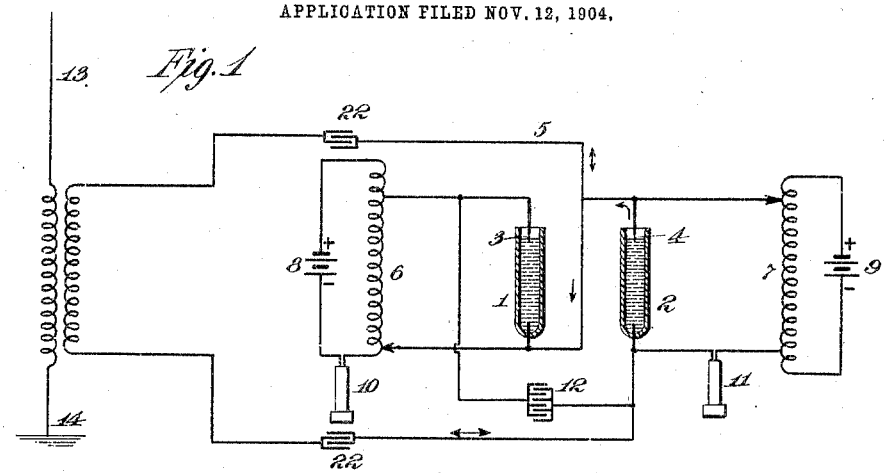
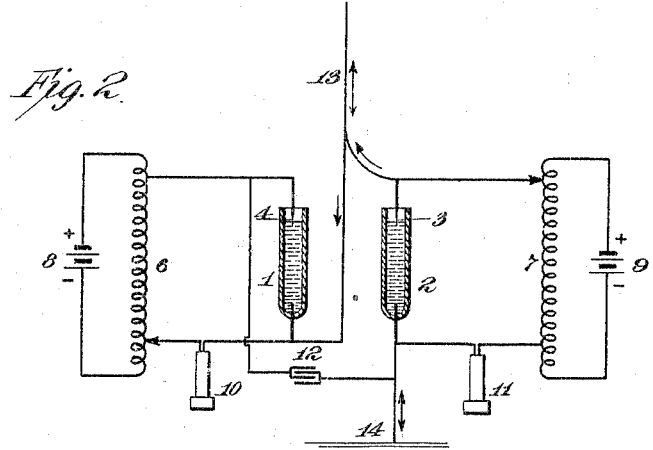
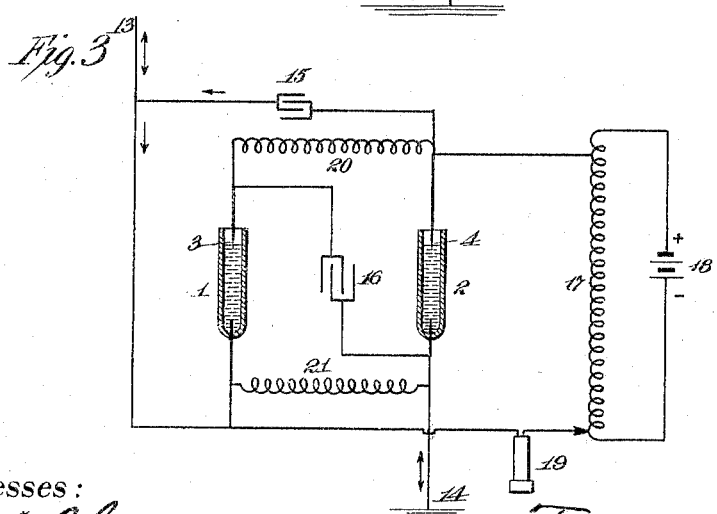
Witnesses:
Jno. F. Coleman
Jno. Robt. Taylor
Inventor
Frederick K. Vreeland
By Dyer & Dyer
Attorneys.

No. 783,712. Patented February 28, 1905.

UNITED STATES PATENT OFFICE.

FREDERICK K. VREELAND, OF MONTCLAIR, NEW JERSEY, ASSIGNOR TO WIRELESS TELEGRAPH EXPLOITATION COMPANY, OF NEW YORK, N. Y., A CORPORATION OF NEW YORK.

APPARATUS FOR RECEIVING ELECTROMAGNETIC WAVES OR OTHER FEEBLE ALTERNATING SIGNAL IMPULSES.

SPECIFICATION forming part of Letters Patent No. 783,712, dated February 28, 1905.

Application filed November 12, 1904. Serial No. 232,478.

*To all whom it may concern:*

Be it known that I, FREDERICK K. VREELAND, a citizen of the United States, residing at Montclair, in the county of Essex and State of New Jersey, have invented a certain new and useful Apparatus for Receiving Electromagnetic Waves or other Feeble Alternating Signal Impulses, of which the following is a description.

My invention is an improvement upon the polarization-receiver or "polariphone" described in my application, Serial No. 219,016, filed August 1, 1904, and its purpose is to increase the sensitiveness of the receiver. This I accomplish by the employment of two electrolytic cells with minute anodes, such as are described in said application, connected in parallel with each other and oppositely with the antenna and ground or in a resonant circuit or other circuit carrying the signal impulses. The cells being polarized by a local source of current, the alternating signal impulses pass through the cells selectively, resulting in the partial or complete depolarization of the cells and in an increase of the local current through the signal-receiving instrument. When a single cell is connected to an antenna, as described in said application, or in a closed resonant circuit in the ordinary way, the two halves of the alternating current-wave affect it in opposite senses. The minus half—*i. e.*, that which flows from cathode to minute anode—tends to depolarize the cell, and so is effective. The positive half—*i. e.*, that which flows from minute anode to cathode—tends to polarize the cell, and so partially annuls the effect of the minus half. Moreover, the negative current flows readily through the cell, while the positive current encounters opposition and wastes energy in evolving gas. By the employment of two cells connected in parallel with each other and having their polarities reversed with respect to the signal-receiving circuit the whole wave is made effective in one or the other half of the apparatus.

The arrangement is particularly well suited for use in resonant circuits for syntonic signaling, as none of the wave-energy is wasted in decomposing the electrolyte, and the damping of the oscillations is thus less than in the case where a single cell is used.

In the drawings, Figure 1 is a diagrammatic view showing my invention applied to a syntonic receiver. Fig. 2 is a similar view illustrating the invention applied to a simple responsive receiver, while Fig. 3 is a similar view illustrating the employment of a single local battery for polarizing both of the cells.

Referring particularly to Fig. 1, 1 and 2 are the electrolytic cells, having minute anodes 3 4, as described in my application referred to. These cells are connected in parallel, with their polarities reversed, in a resonant circuit 5 of the usual character for syntonic signaling. The cells are shunted by local circuits, including potentiometers 6 7, batteries 8 9, and telephones or other signal-receiving instruments 10 11, or the telephone-coils may be embraced in the same instrument and arranged to have a cumulative effect. A condenser 12 is connected in series with one of the cells, so as to avoid the short-circuiting of the local batteries through each other. The condenser 12 should have a sufficient capacity to permit the free passage through it of the oscillations in the circuit 5 without materially affecting the period of the resonant circuit. The batteries 8 and 9 have their positive poles connected with the minute anodes 3 and 4 and serve to polarize the cells, as described in my application referred to. The cells 1 2 have a selective action upon the alternating impulses passing through the circuit 5, the current passing through both cells from cathode to anode, as indicated by the arrows. Consequently the successive half-waves pass through the cells alternately, with the result that a depolarization of the cells is caused, which produces an increase in the flow of the current from the local batteries and operates the telephones. The antenna and ground are shown at 13 14.

In Fig. 2 a similar arrangement of the parts is illustrated applied to a simple responsive receiver. 1 2 are the cells having minute anodes 3 4. The cells are shunted by local circuits including potentiometers 6 7, batteries 8 9, and telephones 10 11. The batteries 8 9 have their positive poles connected with the minute anodes of the cells. A condenser 12 is connected in series with one of the cells to prevent the short-circuiting of the local batteries. 13 and 14 represent the antenna and ground connections. The alternating currents induced in the antenna pass through the cells 1 2 selectively, as before explained and as indicated by the arrows, causing the depolarization of the cells and the operation of the telephones by the local batteries. The potentiometers 6 7 enable the electromotive forces applied to the cells 1 2 to be independently adjusted.

The arrangement illustrated in Figs. 1 and 2 would be advantageous even if one of the receiving-telephones or other receiving instrument was omitted, since by furnishing a free path for the alternate half-waves through an additional polarized cell the effectiveness of the half-waves acting on the cell having the receiving instrument in its local circuit is increased. I may, however, polarize both cells from the same local battery and operate a signal-receiving instrument by the increase of current in the single-battery circuit produced by the depolarization of both cells. Such an arrangement is illustrated in Fig. 3 in connection with a simple responsive receiver; but obviously it can also be used in connection with a syntonic receiver. 1 and 2 are the electrolytic cells, having minute anodes 3 4, and 13 and 14 are the antenna and ground connections. The antenna is connected with the anode of cell 2 through the condenser 15 and is connected directly with the cathode of cell 1. The anode of cell 1 is connected with the ground connection 14 through condenser 16. The cathode of cell 2 is connected directly with the ground. The local circuit, containing the potentiometer 17, battery 18, and telephone 19, is connected directly at its positive pole with the anode of cell 2 and at its negative pole with the cathode of cell 1. The local circuit is connected on its positive side with the anode of cell 1 through an inductance 20 and on its negative side is connected with the cathode of cell 2 through an inductance 21. The condensers 15 16 assure the proper flow of the current from the local battery through the cells 1 2, while affording free paths for the high-frequency currents induced in the antenna. The inductances 20 21 afford a relatively free path for the current of the local battery, while obstructing the flow therethrough of the high-frequency signal impulses. It will be observed that a condenser is in series with each cell in the antenna-circuit, and an inductance is in series with each cell in the local battery-circuit, and that consequently the circuits are symmetrical. The oscillations induced in the antenna pass selectively through the cells, as before explained and as indicated by the arrows. The cells are polarized in parallel from the single local battery 18, and the depolarization of the cells by the antenna oscillations acts cumulatively to increase the current of the local circuit and to operate the telephone or other receiving instrument.

What I claim is—

1. In a detector of electromagnetic waves or other feeble alternating impulses, the combination of two electrolytic cells having minute anodes, means for polarizing said cells, means for passing the half-waves of the signal impulses through the cells alternately and in the direction opposite to the polorizing-currents, thereby wholly or partially depolarizing said cells, and means for observing the depolarization of one or both cells, substantially as set forth.

2. In a detector of electromagnetic waves, the combination with a tuned resonant circuit, of two electrolytic cells having minute anodes, means for polarizing such cells, means for passing the half-waves of the resonant currents through the cells alternately and in the direction opposite to the polarizing-currents, thereby affording a free path for the resonant currents and reducing their damping, and means for observing the depolarization of one or both cells, substantially as set forth.

3. In a detector of electromagnetic waves or other feeble alternating signal impulses, the combination with a signal-receiving circuit, of two polarized electrolytic cells having minute anodes and connected in said circuit, such cells being so arranged that one cell allows the passage therethrough of the half-waves of the signal impulses which tend to depolarize the cell and excludes currents in the opposite direction, while the other cell utilizes and excludes respectively the alternate half-waves, and means for observing the depolarization of one or both cells, substantially as set forth.

4. In a detector of electromagnetic waves, the combination with a tuned resonant circuit, of two polarized electrolytic cells having minute anodes connected in said circuit, such cells being so arranged that one cell allows the passage therethrough of the half-waves of the signal impulses which tend to depolarize the cell and excludes currents in the opposite direction, while the other cell utilizes and excludes respectively the alternate half-waves, and means for observing the depolarization of one or both cells, substantially as set forth.

5. In a detector of electromagnetic waves or other feeble alternating signal impulses, the combination of two electrolytic cells having minute anodes, a local circuit connected across each cell and including a source of direct electromotive force having its positive pole connected with the minute anode and acting to polarize the cell, means for passing the half-waves of the signal impulses through said cells alternately in parallel and in the direction opposite to the polarizing-currents and thereby completely or partially depolarizing the cells, and one or more signal-receivers in the local circuit or circuits operated by the variations of current therein caused by changes in the polarization of the cells, substantially as set forth.

6. In a detector of electromagnetic waves or other feeble alternating signal impulses, the combination of two electrolytic cells having minute anodes, a local circuit connected across each cell and including a source of direct electromotive force having its positive pole connected with the minute anode and acting to polarize the cell, means for passing the half-waves of the signal impulses through said cells alternately in parallel and in the direction opposite to the polarizing-currents and thereby completely or partially depolarizing the cells, means for excluding the signal impulses from the local circuit or circuits, and one or more signal-receivers in the local circuit or circuits operated by variations of current therein caused by changes in the polarization of the cells, substantially as set forth.

7. In a detector of electromagnetic waves or other feeble alternating signal impulses, the combination of two electrolytic cells having minute anodes, a local circuit connected across each cell and including a source of direct electromotive force having its positive pole connected with the minute anode and acting to polarize the cell, means for passing the half-waves of the signal impulses through said cells alternately in parallel and in the direction opposite to the polarizing-currents and thereby completely or partially depolarizing the cells, a condenser or condensers affording a free path for the signal impulses but an open circuit for the local current arranged so as to properly direct the local current through the cells, and a signal receiver or receivers in the local circuit or circuits operated by the variations of current therein caused by changes in the polarization of the cells, substantially as set forth.

8. In a detector of electromagnetic waves or other feeble alternating signal impulses, the combination of two electrolytic cells having minute anodes, a local circuit connected across each cell and including a source of direct electromotive force having its positive pole connected with the minute anode and acting to polarize the cell, a potentiometer in each of said local circuits for adjusting the electromotive force applied to each cell, a condenser connected between the cells and preventing the short-circuiting of the local batteries, means for passing the half-waves of the signal impulses through said cells alternately in parallel and in the direction opposite to the polarizing-currents, thereby wholly or partially depolarizing said cells, and a signal receiver or receivers in the local circuits operated by the variations of current therein caused by changes in the polarization of the cells, substantially as set forth.

9. In a detector of electromagnetic waves or other feeble alternating signal impulses, the combination with a tuned resonant circuit, of two electrolytic cells having minute anodes connected in said circuit, a local circuit connected across each cell and including a source of direct electromotive force having its positive pole connected with the minute anode and acting to polarize the cell, means for passing the half-waves of the signal impulses through said cells alternately in parallel and in the direction opposite to the polarizing-currents and thereby completely or partially depolarizing the cells, means for excluding the signal impulses from the local circuit or circuits, and one or more signal-receivers in the local circuit or circuits operated by variations of current therein caused by changes in the polarization of the cells, substantially as set forth.

10. In a detector of electromagnetic waves or other feeble alternating signal impulses, the combination with a tuned resonant circuit, of two electrolytic cells having minute anodes connected in said circuit, a local circuit connected across each cell and including a source of direct electromotive force having its positive pole connected with the minute anode and acting to polarize the cell, means for passing the half-waves of the signal impulses through said cells alternately in parallel and in the direction opposite to the polarizing-currents and thereby completely or partially depolarizing the cells, a condenser or condensers affording a free path for the signal impulses but an open circuit for the local current arranged so as to properly direct the local current through the cells, and a signal receiver or receivers in the local circuit or circuits operated by the variations of current therein caused by changes in the polarization of the cells, substantially as set forth.

11. In a detector of electromagnetic waves or other feeble alternating signal impulses, the combination with a tuned resonant circuit, of two electrolytic cells having minute anodes connected in said circuit, a local circuit connected across each cell and including a source of direct electromotive force having its positive pole connected with the minute anode and acting to polarize the cell, a potentiometer in each of said local circuits for adjusting the electromotive force applied to each cell, a condenser connected between the cells and preventing the short-circuiting of the local batteries, means for passing the half-waves of the signal impulses through said cells alternately in parallel and in the direction opposite to the polarizing-currents, thereby wholly or partially depolarizing said cells, and a signal receiver or receivers in the local circuits operated by the variations of current therein caused by changes in the polarization of the cells, substantially as set forth.

This specification signed and witnessed this 9th day of November, 1904.

FREDERICK K. VREELAND.

Witnesses:
  JNO. ROBT. TAYLOR,
  JOHN L. LOTSCH.